(12) United States Patent
Padilla-Acevedo

(10) Patent No.: US 10,934,473 B2
(45) Date of Patent: Mar. 2, 2021

(54) THERMALLY STABLE SCALE INHIBITOR COMPOSITIONS

(71) Applicant: Dow Global Technologies LLC, Midland, MI (US)

(72) Inventor: Angela I. Padilla-Acevedo, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 321 days.

(21) Appl. No.: 15/781,583

(22) PCT Filed: May 9, 2016

(86) PCT No.: PCT/US2016/031403
§ 371 (c)(1),
(2) Date: Jun. 5, 2018

(87) PCT Pub. No.: WO2017/099840
PCT Pub. Date: Jun. 15, 2017

(65) Prior Publication Data
US 2020/0263076 A1    Aug. 20, 2020

Related U.S. Application Data

(60) Provisional application No. 62/263,893, filed on Dec. 7, 2015.

(51) Int. Cl.
  *C09K 8/528* (2006.01)
  *E21B 37/06* (2006.01)
  *E21B 43/22* (2006.01)
(52) U.S. Cl.
  CPC ............. *C09K 8/528* (2013.01); *E21B 37/06* (2013.01)

(58) Field of Classification Search
  CPC ........ C09K 8/528; C09K 8/524; C09K 11/06; C09K 5/10; C09K 8/592; C09K 8/54; E21B 37/06; E21B 43/16
  See application file for complete search history.

(56) References Cited

U.S. PATENT DOCUMENTS

| | | | |
|---|---|---|---|
| 4,288,327 | A | 9/1981 | Godlewski et al. |
| 4,952,327 | A | 8/1990 | Amjad et al. |
| 2003/0149210 | A1 | 8/2003 | Hurtevent et al. |
| 2005/0096233 | A1 | 5/2005 | Hurtevent |
| 2012/0118575 | A1 | 5/2012 | Griffin |
| 2018/0072599 | A1 | 3/2018 | Padilla-Acevedo |

FOREIGN PATENT DOCUMENTS

| | | |
|---|---|---|
| EP | 0184894 A1 | 6/1986 |
| EP | 564248 A1 | 10/1993 |
| EP | 0792998 A1 | 9/1997 |
| WO | 2014/176419 A1 | 10/2014 |

OTHER PUBLICATIONS

PCT/US2016/031403, International Search Report and Written Opinion dated Sep. 1, 2016.
PCT/US2016/031403, International Preliminary Report on Patentability dated Jun. 12, 2018.

*Primary Examiner* — Zakiya W Bates

(57) ABSTRACT

Embodiments relate to a polymeric scale inhibitor that is a polycarboxylic acid copolymer comprising acrylic acid, methacrylic acid, and styrene sulfonic acid. The polymeric scale inhibitor compositions are particularly suitable for high pressure/high temperature scale inhibition treatment of oil, gas, geothermal production wells and/or subterranean formations.

5 Claims, No Drawings ns, these compositions degrade and do not perform their desired function as a scale inhibitor.

US Publications 2012/0118575 and 2005/0096233 relate to a process for preventing scale in an aqueous system by introducing a water soluble polymer comprising a non-ionizable unsaturated monomer, a vinyl sulfonic acid, and a styrene sulfonic acid. While water soluble polymeric scale inhibitors comprising in their backbone an aliphatic sulfonic acid (i.e., vinyl sulfonate) demonstrate good inhibition to forming calcite, upon thermal aging at moderate to high temperatures said inhibitors demonstrate a dramatic reduction in effectiveness.

There is a need for a scale inhibitor composition having good thermal stability useful for high pressure/high temperature applications and for brines with elevated calcium concentrations.

THERMALLY STABLE SCALE INHIBITOR COMPOSITIONS

FIELD OF THE INVENTION

The present invention relates to thermally stable polymeric scale inhibitor compositions, and use thereof. Specifically, said composition comprises a polycarboxylic acid comprising acrylic acid, methacrylic acid, and styrene sulfonic acid. The polymeric scale inhibitor compositions of the present invention are particularly suitable for high pressure/high temperature applications and for use with brine having high calcium concentrations.

BACKGROUND OF THE INVENTION

Scale inhibiting polymers are often used in water treatment and oil field applications to minimize and/or prevent scale deposition. The deposition of scale can occur in the transport of aqueous mixtures and in subterranean rock formations due to the presence of water bearing alkaline earth metal cations such as calcium, barium, strontium and the like as well as the presence of anions such as phosphate, sulfates, carbonates, silicates and the like. When these ions are in sufficient concentrations, a precipitate can form that builds up on interior surfaces of the conduits used for transport or in the subterranean rock formations, which restrict flow of the media of interest, e.g., water or oil.

In oilfield applications, scales that are commonly formed include calcium sulfate, barium sulfate, and/or calcium carbonate scales that are generally formed in the fresh waters or brines used in well stimulation as a result of increased concentrations of these particular ions, the water pH, pressures, and temperatures. In addition, calcium phosphate can form in the presence of phosphates commonly used to treat wells and pipes for corrosion. The buildup of these mineral precipitates can reduce or block flow in the conduits and rock formations as well as cause other problems. In many cases, the first warning of the existence of a significant scale deposit may be a decline in well performance. In these instances, scale removal techniques may become necessary. As a result, a potentially substantial cost including downtime is required to affect repair as a result of scaling.

Scale inhibiting materials are commonly applied to rock formations by means of a squeeze treatment prior to production. In these applications, a relatively concentrated form of the scale inhibitor is added. Using the method, the scale inhibitor is pumped into a water-producing zone and attaches to the formation by chemical adsorption or by temperature-activated precipitation. When the well is put back into production, the scale inhibitor leaches out of the formation rock to provide scale inhibition.

Capillary injection is another method for delivering scale inhibiting materials. In capillary injection, a relatively concentrated form of the scale inhibitor composition is continuously pumped into the well during production.

Due to changing patterns of energy usage and availability, exploration and production is occurring at increasing depths. As a result, the chemicals used to enhance oil and gas production are subjected to increasing temperatures (i.e., 150° C. to 230° C.) and pressures (i.e., 25,000 to 30,000 psi), which are generally known to both increase as a function of well depth. Many of the compositions commonly used as scale inhibitors have an acidic pH and are unstable under high temperature and pressure conditions. Under such con-

BRIEF SUMMARY OF THE INVENTION

A method for scale inhibition treatment of fresh water or brine used in an oil, gas, and geothermal production well or subterranean formation comprising the step of introducing an aqueous scale inhibiting composition into the oil and gas production well or subterranean formation wherein the aqueous scale inhibiting composition comprises a polycarboxylic acid copolymer comprising or consisting essentially of or consisting of the following monomers: i) two or more monoethylenically unsaturated acid and/or anhydride and/or salts thereof, preferably a) acrylic acid, preferably in an amount of 50 to 70 weight percent and b) methacrylic acid, preferably in an amount of 15 to 25 weight percent, and ii) a styrene sulfonic acid and/or one of its salts, preferably 4-styrene sulphonic acid, preferably in an amount of 15 to 25 weight percent, wherein weight percents are based on the combined weight of the monomers.

In one embodiment of the present method disclosed herein above, the polycarboxylic acid copolymer is a copolymer comprising or consisting essentially of or consisting of acrylic acid, methacrylic acid, and 4-styrene sulphonic acid, preferably having a weight average molecular weight of from 1,000 to 50,000 Daltons.

In one embodiment of the present method disclosed herein above, the aqueous scale inhibiting composition is introduced by a squeeze treatment.

In another embodiment of the present method disclosed herein above, the aqueous scale inhibiting composition is introduced by a capillary injection treatment.

In another embodiment of the present method disclosed herein above, the scale inhibiting treatment is preformed under temperature conditions from 230° C. to 260° C.

In another embodiment of the present method disclosed herein above, the fresh water or brine has a calcium concentration equal to or greater than 15,000 ppm.

DETAILED DESCRIPTION OF THE INVENTION

The scale inhibitor composition according to the present invention comprises a polycarboxylic acid copolymer which is the reaction product comprising, consisting essentially of, or consisting of the following monomers: i) two or more monoethylenically unsaturated acids (herein after referred to as a first monoethylenically unsaturated acid and a second monoethylenically unsaturated acid) and/or anhydrides and/or salts thereof and ii) a styrene sulfonic acid and/or one of its salt. Polycarboxylic acid polymers and methods to polymerize them are well known; see U.S. Pat. Nos. 5,294, 686 and 6,001,940, both of which are incorporated by reference in their entirety. Any suitable polymerization method can be used to prepare the polycarboxylic acid copolymers of the present invention, such as free-radical polymerization method, aqueous bulk/dispersion polymerization, solution polymerization, or emulsion polymerization.

The copolymerization of the comonomers can be carried out in the presence of polymerization initiators including, without limitation, ammonium persulfate, sodium persulfate, potassium persulfate, azo initiators, azobisisobutyronitrile (AIBN), organic or inorganic peroxides, cerium ammonium nitrate, perchlorates, and the like. The polymerization initiators are generally in an amount of about 0.01 to about 10 weight percent based on the total weight of the monomers as is appreciated by those skilled in the art.

In some embodiments, the polycarboxylic acid copolymer of the present invention has at least three comonomers, the first and second monoethylenically unsaturated acids and styrene sulfonic acid, in other embodiments the copolymer may have, in addition to the two monoethylenically unsaturated acids and styrene sulfonic acid, one or more additional comonomers, in other words, the polycarboxylic acid copolymer of the present invention may have three, four, five, six, or more comonomers.

In some embodiments, the polycarboxylic acid copolymer of the present invention has only three comonomers, the first and second monoethylenically unsaturated acids and styrene sulfonic acid, Suitable monoethylenically unsaturated acids can be mono-acids, di-acids or polyacids and the acids may be carboxylic acids, phosphonic acids, salts or combinations thereof. Suitable monoethylenically unsaturated acids are, for example, acrylic acid, methacrylic acid, crotonic acid, vinylacetic acid, acid and the alkali metal and ammonium salts thereof. Suitable monoethylenically unsaturated dicarboxylic acids and the anhydrides of the cis-dicarboxylic acids are, for example, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid and the alkali metal and ammonium salts thereof. Other suitable monoethylenically unsaturated acids include allylphosphonic acid, isopropenylphosphonic acid, vinylphosphonic acid, and the alkali metal and ammonium salts thereof. Most preferably, the two or more monoethylenically unsaturated carboxylic acids include acrylic acid and methacrylic acid.

Suitable polycarboxylic acid copolymers may comprise one or more monoethylenically unsaturated acid monomer copolymerized with one or more monoethylenically unsaturated acid-free monomers.

Suitable monoethylenically unsaturated acid-free monomers include $C_1$ to $C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other monoethylenically unsaturated acid-free monomers are acrylamides and alkyl-substituted acrylamides including acrylamide, methacrylamide, N-tertiarybutylacrylamide, N-methylacrylamide, and N,N-dimethylacrylamide. Other examples of monoethylenically unsaturated acid-free monomers include acrylonitrile, methacrylonitrile, allyl alcohol, phosphoethyl methacrylate, 2-vinylpyridine, 4-vinylpyridine, N-vinylpyrrolidone, N-vinylformamide, N-vinylimidazole, vinyl acetate, and styrene.

Preferred comonomers are a maleic acid and vinyl acetate, acrylic acid and vinyl acetate, acrylic acid and N-tertiarybutylacrylamide, methacrylic acid and vinyl acetate, methacrylic acid and N-tertiarybutylacrylamide, more preferably acrylic acid and methacrylic acid, wherein the resulting polymers may consist of only the two monomers described herein above or comprise the two monomers described and one or more additional monomers.

The first monoethylenically unsaturated acid, preferably acrylic acid, is present in the copolymer in an amount equal to or greater than 40 weight percent, preferably equal to or greater than 45 weight percent, and more preferably equal to or greater than 50 weight percent of polymerized monomers. The first monoethylenically unsaturated acid is present in the copolymer in an amount equal to or less than 80 weight percent, preferably equal to or less than 75 weight percent, and more preferably equal to or less than 70 weight percent of the weight of the polymerized monomers.

The second monoethylenically unsaturated acid, preferably methacrylic acid, is present in the copolymer in an amount equal to or greater than 5 weight percent, preferably equal to or greater than 10 weight percent, and more preferably equal to or greater than 15 weight percent of polymerized monomers. The second monoethylenically unsaturated acid is present in the copolymer in an amount equal to or less than 45 weight percent, preferably equal to or less than 35 weight percent, and more preferably equal to or less than 25 weight percent of polymerized monomers.

The two or more monoethylenically unsaturated acids are polymerized with a styrene sulfonic acid or its salt. Among the styrene sulphonic acids (and their salts), 4-styrene sulphonic acid is preferably used.

The styrene sulfonic acid is present in the polycarboxylic acid copolymer in an amount equal to or greater than 5 weight percent, preferably equal to or greater than 10 weight percent, and more preferably equal to or greater than 15 weight percent of polymerized monomers. The styrene sulfonic acid is present in the polycarboxylic acid copolymer in an amount equal to or less than 45 weight percent, preferably equal to or less than 35 weight percent, and more preferably equal to or less than 25 weight percent of polymerized monomers.

In one embodiment of the present invention, the polycarboxylic copolymer comprises: i) from 50 weight percent to 70 weight percent of a first monoethylenically unsaturated acid and/or anhydride and/or one of its salts and from 15 weight percent to 25 weight percent of a second monoethylenically unsaturated acid and ii) from 15 weight percent to 25 weight percent of styrene sulfonic acid and/or one of its salts, wherein weight percent is based on total weight of polymerized monomers.

When the polycarboxylic acid copolymer comprises units derived from unsaturated polycarboxylic acids (and/or their salts) and/or styrene sulfonic acid (and/or its salts), sodium, potassium, or ammonium salts of said acids are preferably used. When one or more salt is present, each salt is preferably equal to or less than 30 weight percent, more preferably equal to or less than 20 weight percent, more preferably equal to or less than 15 weight percent, more preferably equal to or less than 10 weight percent, more preferably equal to or less than 5 weight percent, more preferably equal to or less than 1 weight percent of the polymerized monomers.

The aqueous solution of the present invention comprises from 1 weight percent to 50 weight percent polycarboxylate copolymer based on the total weight of the aqueous solution. Preferably, the polycarboxylic acid copolymer is present in the aqueous solution of the present invention in an amount equal to or greater than 1 weight percent, more preferably equal to or greater than 5 weight percent, and even more preferably equal to or greater than 10 weight percent based on the total weight of the aqueous solution. Preferably, the polycarboxylic acid copolymer is present in the aqueous solution of the present invention in an amount equal to or less than 60 weight percent, more preferably equal to or less than 50 weight percent, and even more preferably equal to or less than 20 weight percent based on the total weight of the aqueous solution.

Preferably the polycarboxylic acid copolymer is a low molecular weight polymer having a weight average molecular weight equal to or less than 50,000. Preferably, the weight average molecular weight of the polycarboxylic acid copolymer is equal to or greater than 1,000 Daltons, more preferably equal to or greater than 2,500 Daltons, and even more preferably equal to or greater than 5,000 Daltons. Preferably, the weight average molecular weight of the polycarboxylic acid copolymer is equal to or less than 40,000 Daltons weight percent, more preferably equal to or less than 20,000 Daltons, and even more preferably equal to or less than 10,000 Daltons.

Experiments can be conducted in a laboratory to determine an effective minimum inhibitor concentration (MIC) which just inhibits inorganic scale formation under simulated production conditions. The ability of the operator to quickly and accurately determine the amount of scale inhibitor in the produced fluids and compare this to the MIC values generated allows him to decide when it is necessary or desirable to retreat the reservoir or increase the topside addition rate to ensure that no damage occurs to his reservoir or equipment due to inorganic scale deposition.

The effective MIC for a non-thermally aged scale inhibitor of the present invention is equal to or less than 30 ppm, more preferably equal to or less than 25 ppm, and most preferably equal to or less than 10 ppm. The effective minimum inhibitor concentration (MIC) for a 200° C. thermally aged scale inhibitor of the present invention is equal to or less than 30 ppm, more preferably equal to or less than 20 ppm, more preferably equal to or less than 15 ppm, and most preferably equal to or less than 10 ppm. Preferably the scale inhibitor of the present invention has a % difference in MIC ($MIC_\Delta$) between $MIC_{non-aged}$ and $MIC_{aged\ @200°\ C.}$ of equal to or less than 50%, preferably equal to or less than 25%, preferably equal to or less than 20%, and most preferably equal to or less than 15% where $$MIC_\Delta = \frac{MIC_{aged@200°C} - MIC_{non-aged}}{MIC_{non-aged}} \times 100$$

wherein $MIC_\Delta$ may be a negative number, for example a value of $MIC_\Delta = -20\%$ denotes a $MIC_\Delta$ value less than zero.

According to some embodiments, the scale inhibiting polymer compositions of the present invention may be used treat scale in any water system in which scale may be likely to form. Exemplary water systems, include, without limitation, cooling tower water systems (including open recirculating, closed and once-through systems); petroleum wells, downhole formations, geothermal wells and other oil field applications; boilers and boiler water systems; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as pasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

A preferred embodiment of the present invention is a method for scale inhibition treatment of an oil, gas, or geothermal production well and/or subterranean formation. The scale inhibition composition of the present invention may be introduced by capillary injection and/or by a squeeze treatment.

Capillary injection of scale inhibitor can be carried out topside or downhole via chemical injection lines. Capillary injection at the wellhead or downhole may be needed in injector wells, especially for produced water reinjection, or in producing well streams. Capillary injection in the injector wells has also been carried out to prevent scaling in producing wells. Capillary injection into produced waters is usually carried out topside at the wellhead, where other production chemicals, such as corrosion inhibitors, may be injected. In fact, many scale inhibitors are not compatible with certain corrosion inhibitors. Scale inhibitors can also be injected downhole if a capillary string is available or via the gas lift injection system. In gas lift injection, it is important to add a low-vapor-pressure solvent (vapor pressure depressant, VPD) such as a glycol to the aqueous scale inhibitor solution to avoid excessive solvent evaporation and "gunking" of the scale inhibitor. In addition, glycol or some other hydrate inhibitor may be needed to suppress gas hydrate formation. A scale dissolver blended with a scale inhibitor has also been deployed in a gas lift system.

For capillary injection applications, the concentration of polycarboxylic acid copolymer in the aqueous scale inhibitor composition of the present invention is equal to or greater than 1 weight percent, preferably equal to or greater than 5 weight percent, more preferably equal to or greater than 10 weight percent, more preferably equal to or greater than 15 weight percent, more preferably equal to or greater than 20 weight percent, and more preferably equal to or greater than 25 weight percent based on the total weight of the aqueous scale inhibitor composition. For capillary injection applications, the concentration of polycarboxylic acid copolymer in the aqueous scale inhibitor composition of the present invention is equal to or less than 90 weight percent, preferably equal to or less than 80 weight percent, more preferably equal to or less than 70 weight percent, more preferably equal to or less than 60 weight percent, more preferably equal to or less than 50 weight percent, more preferably equal to or less than 40 weight percent, more preferably equal to or less than 35 weight percent, and more preferably equal to or less than 30 weight percent based on the total weight of the aqueous scale inhibitor composition.

Downhole injection of some scale inhibitors can lead to increased downhole corrosion rates.

The basic idea in a scale inhibition squeeze treatment is to protect the well downhole from scale deposition and formation damage. The inhibitor will, of course, continue to work above the wellhead, protecting the pipeline from scaling, but a further dose of a scale inhibitor may be needed topside. In a squeeze treatment, a solution of the scale inhibitor is injected into the well above the formation pressure whereby the inhibitor solution will be pushed into the near-well formation rock pores. The well is then usually shut in for a period of hours to allow the inhibitor to e retained, by various mechanisms, in the rock matrix. When the well is put back on stream again, produced water will pass the pores where the chemical has been retained, dissolving some of it. In this way, the produced water should contain enough scale inhibitor to prevent scale deposition. When the concentration of the inhibitor falls below the MIC (minimum inhibitor concentration that prevents scale deposition), the well should be resqueezed. Naturally, long squeeze lifetimes will keep the overall downhole scale treatment costs to a minimum.

In one embodiment, the scale inhibiting polymer composition used in a squeeze application may be diluted in a carrier solvent (usually brine) and propagated out to an optimized radial distance into the oil producing formation, where it is retained and then released slowly back into the aqueous phase during normal well production. In one embodiment, the squeeze process generally includes applying a dilute solution of the scale inhibiting polymer with surfactant (0.1 weight percent) to clean and cool the near wellbore. Once cleaned, a high concentration solution of the scale inhibiting polymer at between 5 and 20 weight percent is introduced, followed by a low concentration solution of the scale inhibiting polymer. The solutions are left in contact with the reservoir for a period of time effective to allow for adsorption equilibration, after which the well is returned to production. Adhesion to the formation allows the scale inhibiting polymer to remain within the near-wellbore area without being pumped up in the oil/water emulsion Although squeeze application of the chemical is one of the most common method of treating downhole scale, the product could also be applied by other techniques commonly used offshore, which include gas-lift injection, downhole annulus injection, encapsulation or soluble matrix techniques, sub-sea wellhead injection via umbilical or indeed secondary topside treatments to enhance inhibitor performance as process conditions vary scaling tendency.

In a preferred embodiment, the scale inhibiting composition of the present invention is used in treating scale under high temperature and/or high pressure conditions, for example in oil, gas, or geothermal productions wells. The scale inhibiting compositions may be used to treat scale in conditions wherein the temperature is at least about 100° C. or in the range of about 120° C. to about 260° C., preferably in the range of 230° C. to 260° C. The scale inhibiting compositions also may be used to treat scale in conditions wherein the pressure is at least about 5,000 psi or in the range of about 5,000 psi to about 35,000 psi. In a particular embodiment, the scale inhibition treatment is at a temperature of about 120° C. to about 260° C., preferably 230° C. to 260° C., and a pressure of about 5,000 to 35,000 psi.

In a preferred embodiment, the scale inhibiting composition of the present invention is used in treating scale under conditions wherein the brines used in oil or gas production well stimulation have an elevated concentration of calcium. The scale inhibiting compositions may be used to treat scale in brines having a calcium concentration equal to or greater than 12,000, preferably equal to or greater than 15,000 and more preferably having a calcium concentration equal to or greater than 18,000 ppm.

The scale inhibitor polymer and/or composition may be used in an amount effective to produce any necessary or desired effect. In one embodiment, an effective amount of the scale inhibitor composition of the embodiments may be dependent on one or more conditions present in the particular system to be treated and scale inhibiting moieties in the scale inhibiting polymer, as would be understood to one of skill in the art. The effective amount may be influenced, for example, by factors such as the area subject to deposition, temperature, water quantity, and the respective concentration in the water of the potential scale and deposit forming species.

For squeeze applications, the concentration of polycarboxylic acid copolymer in the aqueous scale inhibitor composition of the present invention is equal to or greater than 1 weight percent, preferably equal to or greater than 5 weight percent, more preferably equal to or greater than 10 weight percent, more preferably equal to or greater than 20 weight percent, and more preferably equal to or greater than 30 weight percent based on the total weight of the aqueous scale inhibitor composition. For squeeze applications, the concentration of polycarboxylic acid copolymer in the aqueous scale inhibitor composition of the present invention is equal to or less than 60 weight percent, preferably equal to or less than 50 weight percent, and more preferably equal to or less than 40 weight percent, based on the total weight of the aqueous scale inhibitor composition.

In one embodiment of the present invention, the aqueous scale inhibitor compositions of the present invention comprise 10 weight percent, more preferably 15, more preferably 16, more preferably 17, more preferably 18, more preferably 19, more preferably 20, more preferably 21, more preferably 22, more preferably 23, more preferably 24, more preferably 25, more preferably 26, more preferably 27, more preferably 28, more preferably 29, more preferably 30, more preferably 31, more preferably 32, more preferably 33, more preferably 34 or more preferably 35 weight percent of the polymer by weight of the total aqueous scale inhibitor composition.

According to various embodiments, the treatment composition according to the present disclosure will be effective when the scale inhibitor polymer is used at levels equal to or less than 500 parts per million (ppm). In some embodiments, the composition is effective at concentrations of at least 1 ppm, preferably from 1 ppm to 100 ppm; and in still other embodiments; the effective concentration is 1 to about 50 ppm. In certain embodiments, the effective concentration of the polymer is equal to or less than 10 ppm, preferably equal to or less than 20 ppm, more preferably equal to or less than 30 ppm, more preferably equal to or less than 40 ppm or even more preferably equal to or less than 50 ppm. In various embodiments, the treatment composition can be added directly into the desired aqueous system to be treated in a fixed quantity provided the pH is subsequently adjusted to neutralize the polymer as noted above or can be provided as an aqueous solution and added continuously or intermittently to the aqueous system as can be desired for some applications.

EXAMPLES

The scale inhibitor evaluated as Example 1 is a low molecular weight polyacrylic acid copolymer comprising 55 weight percent acrylic acid, 20 weight percent methacrylic acid, and 25 weight percent styrene sulfonic acid) having a weight average Mw of about 7,600 Daltons.

The scale inhibitor evaluated as Comparative Example A is a low molecular weight polyacrylic acid copolymer comprising 80 weight percent acrylic acid and 20 weight percent methacrylic acid having a weight average Mw of about 3,100 Daltons available as ACCENT™ 1126 from The Dow Chemical Company.

Thermal aging of the scale inhibitors is carried out primarily under squeeze application type conditions. The scale inhibitors are tested as 20 wt % solutions in sulfate-free sea water in a Teflon-lined Parr acid digestion bomb placed in a vented oven.

Preparation of Aqueous Scale Inhibitor Solutions

The scale inhibitor is dissolved in synthetic sulfate-free sea water. The composition of the sulfate-free sea water is described in Table 1. The appropriate amount of scale inhibitor is added to a 6 oz. glass bottle and diluted with the appropriate amount sulfate-free sea water to prepare a 20 wt % active solution. Next the bottle is capped and shaken manually to mix thoroughly.

TABLE 1

| Ion | Ion in solution (ppm) | Salt | Mass of salt (g) in 1 L deionized water |
| --- | --- | --- | --- |
| Na | 10890.00 | NaCl | 27.682 |
| K | 460.00 | KCl | 0.877 |
| Mg | 1368.00 | $MgCl_2 6H_2O$ | 11.443 |
| Ca | 428.00 | $CaCl_2 2H_2O$ | 1.570 |
| Ba | 0.00 | $BaCl_2 2H_2O$ | 0.000 |
| Sr | 0.00 | $SrCl_2 6H_2O$ | 0.000 |
| $SO_4$ | 0.00 | $Na_2SO_4$ | 0.000 |
| Cl | 21957.00 | | |
| | | Total Mass | 41.572 |

Preparation of Non-Aged Scale Inhibitor Aqueous Solutions

For both Comparative Example A and Example 1, a 1000 ppm aqueous solution of the scale inhibitor is made in a 250 mL plastic bottle using deionized water.

Preparation of Aged Scale Inhibitor Aqueous Solutions

Parr vessel PTFE liners are weighed and then filled with inhibitor solution (Note: the amount of inhibitor solution added is equal to or less than 60% of the PTFE cup capacity). The PTFE liners and solutions are weighed and weights recorded. Said samples of Comparative Example A and Example 1 are placed in a Parr vessel equipped with a PTFE liner. Prior to sealing the vessels, nitrogen gas is bubbled through the solution for 30 minutes and then the solution is degassed under vacuum. Once degassed, the vessels are sealed and heated at 200° C. for five days. After five days, the vessels are removed from the Parr reactor and allowed to cool to ambient temperature for 24 hours. After aging, visually, Comparative Example A turns black with precipitate and Example 1 has a slight change in color with no precipitate.

Calcium Carbonate Dynamic "Tube Blocking" Performance Testing

Dynamic "tube blocking" testing is conducted using a PSL Systemtechnik Automated Scale Rig, model number 4025. Test Brine that is prepared by mixing Brine 1 and Brine 2, brine compositions are listed in Table 2.

TABLE 2

| Ion | Test Brine, mg/l | Brine 1, mg/l | Brine 2, mg/l |
| --- | --- | --- | --- |
| Na | 68000 | 47600 | 88400 |
| Ca | 18960 | 37920 | 0 |
| Mg | 680 | 1360 | 0 |
| K | 4960 | 9920 | 0 |
| Ba | 2340 | 4680 | 0 |
| Sr | 1625 | 3250 | 0 |
| $SO_4$ | 0 | 0 | 0 |
| Fe | 0 | 0 | 0 |
| $HCO_3$ | 560 | 0 | 1120 |

The dynamic tests are conducted using the following conditions:
Brine=100% Test Brine (Table 4)
System Temperature=100° C.
System Pressure=250 psi
Coil: 1/16" OD SS316, L=1,000 mm
Flow Rate=10 ml/min total (5 mL from each pump)
pH: 6.2
Blank Scaling Time=5 to 6 min
Pass criterion=>1 psi increase in 30 min
Brine Preparation=Brine 1 and Brine 2 are prepared separately in order to keep scaling cations (Brine 1) and scaling anions (Brine 2) separate, such that on mixing Brine 1 and Brine 2 in a 50:50 ratio would give the required Test Brine composition. Brine 1 and Brine 2 are filtered before use using a 0.45 μm filter. The pH of a 50:50 mix of Brine 1 and Brine 2 is targeted to be pH 6.2.

Testing=Brine 1 and Brine 2 are separately injected into the rig. Once at temperature and pressure they are mixed through a microbore scaling coil. The differential pressure is recorded across the coil to establish the extent of scaling recorded as a function of time.

Blank Testing=Fit a 1 m SS316 coil, start the pumps to flow distilled water through the coil in Test mode and adjust the system pressure to the required 250 psi. Next, prime the pumps in Test Outlet mode with the required brines and put the system back in Test mode. Heat the oven to 100° C. Next, start the blank test with pump 1 injecting Brine 1, pump 2 injecting Brine 2. Record the base line increase in differential pressure as the brine flows through the coil. Measure the time taken to scale to 1 psi increase in differential pressure above the brine base line previously determined across the coil. Allow to scale completely (10 psi is the differential pressure threshold) difference in differential pressure then record the differential pressure and time.

Coil Cleaning=Rinse the coil with 10% citric acid for 2 to 3 hours at 2 ml/min. Rinse the coil with distilled water for 2 to 3 hours at 2 ml/min to 5 ml/min. Check the differential pressure to make sure it returns to the original value to make sure that the coil is clean to start the next experiment.

MIC (Minimum Inhibitor Concentration) Experiment=A solution of the scale inhibitor to be tested is prepared in Brine 2. Prime pump 3 with the inhibitor in Brine 2 stock solution at 5 ml/min. Prime pumps 1 and 2 with the required brines. Start the appropriate chemical MIC testing profile. An example of a MIC testing profile of a scale inhibitor is: 40 ppm (scale inhibitor in Brine 2) for 30 minutes, next 30 ppm for 30 min, next 25 ppm for 30 min, next 20 ppm for 30 min, next 15 ppm for 30 min, next 10 ppm for 30 min. Allow to scale completely and record the differential pressure, the final scale inhibitor concentration and the time of the experiment. The results for Example 1 and Comparative Example A before and after aging are shown in Table 3.

TABLE 3

| | MIC before aging, ppm | MIC after aging @ 200° C., ppm |
|---|---|---|
| Comparative Example A | 3 to 4 | 40 |
| Example 1 | 20 | 10 |

Brine Compatibility Testing

Preparation of test brine solution: A one liter stock solution is prepared of the desired test brine by employing the appropriate inorganic salts for the desired ion concentration (Table 4). The inorganic salts are dissolved in deionized water. Very small quantities of insoluble materials may remain after the inorganic reagents have dissolved. For reproducibility of results, the solutions are filtered through Whatman filter paper Grade 1 prior to use.

Preparation of scale inhibitor solutions: 1,000 ppm scale inhibitor solutions of Example 1 and Comparative Example A are prepared in deionized water. The appropriate amount of scale inhibitor is added to a 250-mL plastic bottle and diluted with the appropriate amount of deionized water. The bottle was capped and shaken manually to mix thoroughly.

TABLE 4

| Ion | Test Brine ppm |
|---|---|
| Na | 68000 |
| K | 4960 |
| Mg | 680 |
| Ca | 18960 |
| Ba | 2340 |
| Sr | 1625 |
| Cl | 147401 |

Benchtop Compatibility Tests with Test Brine

Preparation of solutions in the test brine with different scale inhibitor concentrations:
  Each solution is prepared in duplicate employing 20 g glass vials with caps.
  Using the 1,000 ppm polymer stock inhibitor solutions prepared above, the necessary amount is pippetted into 20 gram glass vials and diluted with test brine to provide concentrations of inhibitor at 25 ppm, 50 ppm, and 100 ppm, on an active basis (typically 40 to 50 weight percent polymer actives).
  Polymer solutions are also tested as 1 wt % "as is" and are prepared by weighing out for example 0.2 g of the 40% wt polymer solution in water and diluting to 20 g with Shearwater brine.
  The mixture is shaken thoroughly using a small vortex mixer.
  Example 1 is tested before and after heat treatment.
  Observations of as to haziness and precipitates are summarized in Table 5.

TABLE 5

| | Compatibility | | | |
|---|---|---|---|---|
| Scale Inhibitor | 25 ppm | 50 ppm | 100 ppm | 1 wt % |
| Com Ex A | | | | |
| not aged | Hazy | Clear | Clear | Hazy/lots precipitates |
| Ex 1 | | | | |
| not aged | Clear | Clear | Clear | Clear/few precipitate |
| aged 200° C. | Clear/few precipitate | Clear/few precipitate | Clear/few precipitate | Slightly hazy/few precipitate |

What is claimed is:

1. A method for scale inhibition treatment of fresh water or brine used in an oil, gas, or geothermal production well or subterranean formation, the method comprising:
   introducing an aqueous scale inhibiting composition into the oil, gas, or geothermal production well or subterranean formation, wherein the aqueous scale inhibiting composition comprises a polycarboxylic acid copolymer acid having a weight average molecular weight of from 1,000 to 50,000 Daltons and consisting essentially of the following monomers:
   i) two or more monoethylenically unsaturated acid and/or anhydride and/or one of its salts
   and
   ii) styrene sulfonic acid and/or one of its salts, wherein:
   the two or more monoethylenically unsaturated acid and/or anhydride and/or one of its salts includes acrylic acid and methacrylic acid,
   the styrene sulfonic acid and/or one of its salts includes 4-styrene sulphonic acid, and
   the acrylic acid is present in an amount of 50 to 70 weight percent, the methacrylic acid is present in an amount of 15 to 25 weight percent, and the styrene sulfonic acid and/or one of its salts is present in an amount of 15 to 25 weight percent, based on the total weight of the polymerized monomers.

2. The method of claim 1 wherein the aqueous scale inhibiting composition is introduced by a squeeze treatment.

3. The method of claim 1 wherein the aqueous scale inhibiting composition is introduced by a capillary injection treatment.

4. The method of claim 1 wherein the scale inhibiting treatment is preformed under temperature conditions from 230° C. to 260° C.

5. The method of claim 1 wherein the brine has a calcium concentration equal to or greater than 15,000 ppm.

* * * * *